US006470156B1

(12) United States Patent
Sahay (10) Patent No.: US 6,470,156 B1
(45) Date of Patent: Oct. 22, 2002

(54) METHOD OF PRINTING VARIABLE IMAGE REQUIREMENTS

(76) Inventor: Ravi B. Sahay, 9176 Danby Ct., San Diego, CA (US) 92129

( * ) Notice: Subject to any disclaimer, the term of this patent is extended or adjusted under 35 U.S.C. 154(b) by 0 days.

(21) Appl. No.: 09/464,230

(22) Filed: Dec. 15, 1999

Related U.S. Application Data

(63) Continuation-in-part of application No. 09/156,003, filed on Sep. 17, 1998, now abandoned.

(51) Int. Cl.$^7$ .............................................. G03G 15/00
(52) U.S. Cl. .......................................................... 399/82
(58) Field of Search ........................ 399/82, 2; 358/296

(56) References Cited

U.S. PATENT DOCUMENTS

| | | | |
|---|---|---|---|
| 4,782,363 A | 11/1988 | Britt et al. ..................... 355/14 |
| 5,184,185 A | 2/1993 | Rasmussen et al. .......... 355/308 |
| 5,187,587 A | 2/1993 | Farrell et al. ................. 358/296 |
| 5,287,194 A | 2/1994 | Lobiondo ..................... 358/296 |
| 5,337,135 A | 8/1994 | Malachowski et al. ...... 355/319 |
| 5,347,351 A | 9/1994 | Morita et al. ................. 355/313 |
| 5,452,068 A | 9/1995 | Farrell ........................... 355/321 |
| 5,488,458 A | 1/1996 | Benedict et al. ............. 355/206 |
| 5,504,568 A | 4/1996 | Saraswat et al. ............. 355/308 |
| 5,655,208 A | 8/1997 | Sahay et al. ................. 399/397 |
| 6,104,498 A | * 8/2000 | Shima et al. ................ 358/1.14 |
| 6,151,464 A | * 11/2000 | Nakamura ..................... 399/79 |

FOREIGN PATENT DOCUMENTS

JP     5-265777   * 10/1993

* cited by examiner

*Primary Examiner*—Quana M. Grainger
(74) *Attorney, Agent, or Firm*—Frank G. Morkunas (57) ABSTRACT

A method of printing personalized variable image requirements by (a) placing all print jobs with similar print image requirements into a particular group, all images for a specific entity in that group being a set; (b) printing images of each set in sequence of arrangement and in cycles, each cycle being a number of images up to the number of storage bins of a printing apparatus used for the print job; (c) storing the printed cycles in the storage bins until all sheets to the sets being stored there are completed; (d) unloading completed sets; repeating steps (b) and (c) if additional sets in the group require printing; (e) ending the print job if all sets for the group have been printed; (f) determining whether a next print job for another group is pending; (g) repeating steps (b)–(g) if a next print job is pending; and (h) ending all print jobs if no print job is pending.

14 Claims, 5 Drawing Sheets

| | S1=C1 | S2=C2 | S3=C3 | S4=C4 |
|---|---|---|---|---|
| CY1 | 1I | 1I | 1I | 1I |
| CY2 | 2I | 2I | 2I | 2I |
| CY3 | 3I | 3I | 3I | 3I |
| CY4 | 4I | 4I | 4I | 4I |
| CY5 | 5I | 5I | 5I | 5I |
| CY6 | 6I | 6I | 6I | 6I |

SG1

| | S5=C5 | S6=C6 |
|---|---|---|
| CY7 | 1I | 1I |
| CY8 | 2I | 2I |
| CY9 | 3I | 3I |
| CY10 | 4I | 4I |
| CY11 | 5I | 5I |
| CY12 | 6I | 6I |

SG2

$N = 4 \quad C^A = 6 \quad I^A = 6$ $SG = (S^A \div N [+1, \text{IF REM} > 0]) = 6 \div 4 = 1 \text{ REM } 2 = 1 + 1 = 2$ $CY = I^A \times SG = 6 \times 2 = 12$

Fig. 4B

| | S1=C1 | S2=C2 | S3=C3 | S4=C4 |
|---|---|---|---|---|
| CY1 | 1I | 1I | 1I | 1I |
| CY2 | 2I | 2I | 2I | 2I |
| CY3 | 3I | 3I | 3I | 3I |
| CY4 | 4I | 4I | 4I | 4I |
| CY5 | 5I | 5I | 5I | 5I |
| CY6 | 6I | 6I | 6I | 6I |
| CY7 | 7I | 7I | 7I | 7I |

SG1

| | S5=C4 | S6=C5 | S7=C6 | S8=C7 |
|---|---|---|---|---|
| CY8 | 1I | 1I | 1I | 1I |
| CY9 | 2I | 2I | 2I | 2I |
| CY10 | 3I | 3I | 3I | 3I |
| CY11 | 4I | 4I | 4I | 4I |
| CY12 | 5I | 5I | 5I | 5I |
| CY13 | 6I | 6I | 6I | 6I |
| CY14 | 7I | 7I | 7I | 7I |

SG2

$N = 4 \quad S^A = 8 \quad I^A = 7$ $SG = (S^A \div N [+1, \text{IF REM} > 0]) = 8 \div 4 = 2 \text{ REM } 0 = 2$ $CY = I^A \times SG = 7 \times 2 = 14$

| CY | S1=C1 | S2=C2 | S3 | S4=C3 | | CY | S5=C4 | S6=C5 | S7=C6 | S8=C7 | | CY | S5=C4 | S6=C5 | S7=C6 | S8=C7 |
|---|---|---|---|---|---|---|---|---|---|---|---|---|---|---|---|---|
| CY1 | 1I | 1I | 1I | 1I | | CY8 | 1I | 1I | 1I | 1I | | CY15 | 1I | 1I | 1I | 1I |
| CY2 | 2I | 2I | 2I | 2I | | CY9 | 2I | 2I | 2I | 2I | | CY16 | 2I | 2I | 2I | 2I |
| CY3 | 3I | 3I | 3I | 3I | | CY10 | 3I | 3I | 3I | 3I | | CY17 | 3I | 3I | 3I | 3I |
| CY4 | 4I | 4I | 4I | 4I | | CY11 | 4I | 4I | 4I | 4I | | CY18 | 4I | 4I | 4I | 4I |
| CY5 | 5I | 5I | 5I | 5I | | CY12 | 5I | 5I | 5I | 5I | | CY19 | 5I | 5I | 5I | 5I |
| CY6 | 6I | 6I | 6I | 6I | | CY13 | 6I | 6I | 6I | 6I | | CY20 | 6I | 6I | 6I | 6I |
| CY7 | 7I | 7I | 7I | 7I | | CY14 | 7I | 7I | 7I | 7I | | CY21 | 7I | 7I | 7I | 7I |
| SG1 | | | | | | SG2 | | | | | | SG3 | | | | |

$N = 4 \quad C^A = 11 \quad S^A = 12 \quad I^A = 7$ $SG = (S^A \div N [ + 1, \text{ IF REM} > 0 ]) = 12 \div 4 = 3 \text{ REM } 0 = 3$ $CY = I^A \times SG = 7 \times 3 = 21$

Fig. 4C

METHOD OF PRINTING VARIABLE IMAGE REQUIREMENTS

CROSS REFERENCES TO RELATED APPLICATIONS

This application is a continuation-in-part of my co-pending U.S. patent application, Ser. No. 09/156,003, filed on Sep. 17, 1998 Abandoned.

STATEMENT REGARDING FEDERALLY-SPONSORED RESEARCH OR DEVELOPMENT

Not applicable.

BACKGROUND OF THE INVENTION

I. Field of the Invention

The present invention relates to a system for controlling a printing machine capable of producing single-sided (simplex) and double-sided (duplex) prints for monochrome or color or mixed monochrome or color to create personalized collated sets containing variable data, as for example, bills, invoices, proposals with personalized cover letters, insurance policies, direct marketing materials etc., with very high productivity.

On-demand page printers, wherein images are created in response to digital image data submitted to the printing apparatus, are familiar in many offices. Such printers create images on sheets typically using electrostatographic or ink-jet printing techniques. In work-group situations, wherein different users at various personal computers and other terminals submit jobs to a single central printing apparatus, various sets of digital image data, corresponding to jobs desired to be printed by different users, are typically kept in an electronic queue, and a control system typically located at the printer sorts through the image data and causes the printer to output the desired prints in an orderly manner.

Particularly with sophisticated printing apparatus, it may often be desired to print "duplex" prints, that is prints having images on both sides of the sheet. However, most currently available printing devices are capable of producing an image only on one side of a sheet at a time. In order to obtain duplex prints, it is almost always necessary to provide an "inverter" within the printing device or apparatus. The purpose of an inverter is to handle a sheet after one side thereof has received an image, and in effect turn the sheet over to make the remaining blank side available to the same printing apparatus which created the first image. In effect, each duplex print is re-fed past the image-making portion of the printing apparatus so that the individual sheet becomes available to the image-making apparatus twice, once for each side.

A long-standing concern of designers of a printing apparatus is how to optimize the use of a printing apparatus for situations wherein some desired prints are simplex and others are duplex as well as some being monochrome and others being color while the number of personalized sets are small (usually one). The fact that each duplex print has to be printed essentially twice and color print may have to be printed multiple times, causes a significant systemic problem with maintaining optimal or near-optimal operation of the entire printing apparatus.

II. Description of the Prior Art

In an electrostatographiic printing apparatus, wherein images are first created on a photoreceptor in the form of a rotating drum or belt and then transferred to sheets, a key concern is the presence of blank pitches (image-sized spaces) along the drum or belt where, for various reasons relating to intermixed simplex or duplex jobs, when no image is created. The problem with blank pitches is that each blank pitch represents lost productivity. In some duplexing and or multi-pass color printing schemes, the number of blank pitches along the belt may be comparable to the number of pitches actually having images on them. In such a situation, not only is the apparatus effectively running at half-speed, but various mechanical parts associated with the drum or belt will be experiencing wear to no productive purpose. Thus, as a general rule, the overall productivity and reliability of such a printing apparatus is inversely related to the number of blank pitches which result in the printing process.

One simple solution, for example intermixed (simplex only) color and monochrome, would be to run every sheet as a color sheet, regardless of whether it is a monochrome or color print, and in the case of each black and white print simply to print nothing on the other transfer cycles. Similarly, for intermixed simplex and duplex jobs, for example, one solution involves running every sheet along the duplex path, regardless of whether it is a simplex or duplex print; and in the case of each simplex print, simply to print nothing on the back side. While this solution is easy to implement, it provides the disadvantages of unnecessarily decreasing the through-put of the whole system.

Another partial solution is to maintain duplex prints which are awaiting printing on the back sides thereof in a special buffer tray, until the system becomes available for printing the back sides of each sheet in sequence. The key disadvantage of this system is that for personalized printing, where the number of identical sets required is one or two, the productivity will be very low due to the idle time while printer is waiting for the one-sided images to settle in the duplex buffer tray. Secondly, significant probability of error exists (a sheet may have the incorrect back side image placed thereon), and also the relatively intense handling of each print sheet in and out of the buffer tray substantially increases a likelihood of mechanical misfeed. Both such problems tend to result from the fact that sheets typically cannot be fed out of the buffer tray reliably. Even with a buffer tray, a fairly sophisticated scheduling system is required.

In the prior art, certain patents assigned to the Xerox Corporation (U.S. Pat. Nos. 5,337,135 and 5,184,185), which are hereby incorporated by reference, have generally dealt with the problem of scheduling sheet s in an imaging system having an endless duplex paper path loop. In general, these various patents disclose different techniques for overcoming the simplex-duplex problem in an electrophotographic printing apparatus. Such techniques include simply finding blank pitches and using them as needed to print simplex prints or cycling down the printer between jobs where a finishing activity, such as stapling, requires an extraordinarily long period of time. Another technique involves causing sheets to move through the system at variable speeds. U.S. Pat. Nos. 5,504,468 and 5,557,367 also assigned to the Xerox Corporation, posits a system in which an optimized schedule for imaging sheets, given the knowledge of the desired output at a given time, is dynamically created in advance in the course of the printing process.

In the case of a conventional two-sided image forming apparatus having a digital scanner and document feeder, copying operations for mixed jobs containing two-sided or single-sided monochrome images are carried out in the manner discussed below.

In order to print a single set of variable print documents, as for example, billing statements, where the number of originals are few and the number of customers are large, the complete print job is treated as one large job with all customer originals accumulated sequentially. The controller automatically checks whether they are one-sided or two-sided images. If one of the pages is two-sided, then, the controller automatically selects the automatic two-sided mode for the whole job. After that, a copy start command is given to the apparatus. The controller prints odd-sided images first in sequence until the duplex loop is filled up followed by the even sided images on the back and then exiting them to the output tray. Printing odd sided images is then resumed, and so on, until the entire job is completed. In this mode of operation, should a toner image representative of a one-sided blank image be transferred to the paper in the same manner as a toner image of a two-sided document, the productivity rate (copying rate) would be critically affected although paper sheets would be discharged in order of page despite the mixture of two different kinds of images. Therefore, the printing operation for the personalized sets of mixed originals where the copying run length is very small (1 or 2 sets), is very inefficient. Also, if the number of sheets in personalized sets is small, as in the case of printing invoices and bills, the productivity losses due to the wait in the duplex loop is significant even if the particular print job involves only duplex copies without any mixed originals.

In situations where personalized mixed printing jobs include color and monochrome, one-sided and two-sided images with variable-data on each page are continuously printed with the image forming apparatus. In such situations generally the printer controller will automatically sort the images into monochrome and color pages, separately print the color pages first, and then run the job in the monochrome mode under a complicated job-programming mode such that previously printed color sheets are also fed into the machine at the proper time under controller command. This operation is very cumbersome and inefficient due to the manual intervention required by the operator to load the pre-printed color sheets for the second pass operation.

Another problem associated with the prior art printing and/or collation devices is that the integrity of the entire print job can be seriously affected due to operator error or to machine multi-feed error. To maintain the set integrity during duplexing, U.S. Pat. No. 5,488,458, dated Jan. 30, 1996, and assigned to the Xerox Corporation, selectively prints solid marks spaced along the sheet on both sides and then reads them with two optical sensors on each side to determine if the corresponding images on both sides have been printed correctly.

SUMMARY OF THE INVENTION

It is therefore an object of the present invention to provide a very productive copier, laser printer, or similar image forming apparatus that may contain personalized information on each page being printed. This invention allows discharging of paper sheets in order of page rapidly in any of various copy or print modes which are practicable with a mixed stack of black and white images and color images, both one-sided and two-sided, to create individual sets. It is another object of the present invention to provide a job integrity auditing system for each finished set while the printing job is in process.

The image forming apparatus assumes a supply means to supply the images, which has a built-in or programmed discrimination means to discriminate whether the document pages are one-sided or two-sided, and also to discriminate whether the pages are black and white or color. Then the image forming apparatus selectively outputs copy sheets in either a one-sided copy mode, two-sided copy mode, or mixed-sided copy mode.

This invention is an improvement over my earlier patent, U.S. Pat. No. 5,655,208, involving an apparatus adaptable to execute this process; in particular, for situations when the number of identical sets to be printed for each customer are small (usually one, two, or three).

A preferred feature of this invention is to provide an efficient method for printing short runs of personalized images with variable-data (as for example, single set of invoices, bills, proposals, and reports for each client) containing a mix of single-sided and two-sided black and white or color pages by making a single copy of the said images in a sequence until the number of sheets is equal to the duplex loop length and which is equal to the minimum number of sorter bins. In this regard single image printing of the documents is first performed (as a first succession or mode) until the two-sided paper path loop is filled. This is followed by the printing of the other side of a two-sided copy (as a second succession or mode) after which these printed copies are sent into intermediate sorter bins, whose number is determined by the maximum number of copy sheets in the two-sided copy loop.

Another preferred feature of this invention to provide a method for insuring job integrity of each completed set, in combination with my new and unique process, by tracking the print copy and matching the entry of such copies into the intermediate sorter bins.

BRIEF DESCRIPTION OF THE DRAWINGS

The above and other objects, features and advantages of the present invention will become more apparent from the following detailed description taken with the accompanying drawings in which.

DETAILED DESCRIPTION OF THE INVENTION

Figure 1:
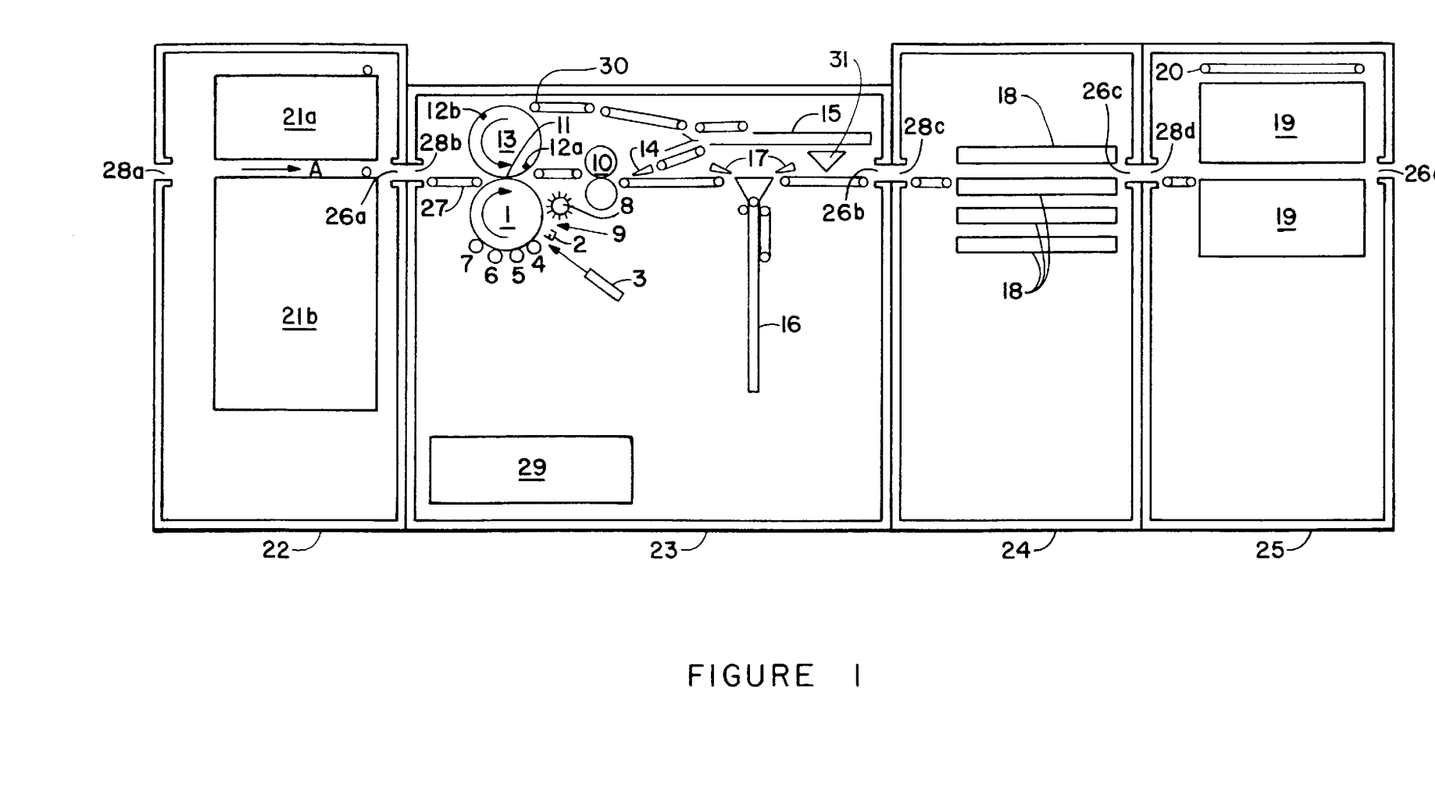
FIG. 1 is a front view section showing an image forming apparatus adaptable to execute the present invention.
Figure 2:
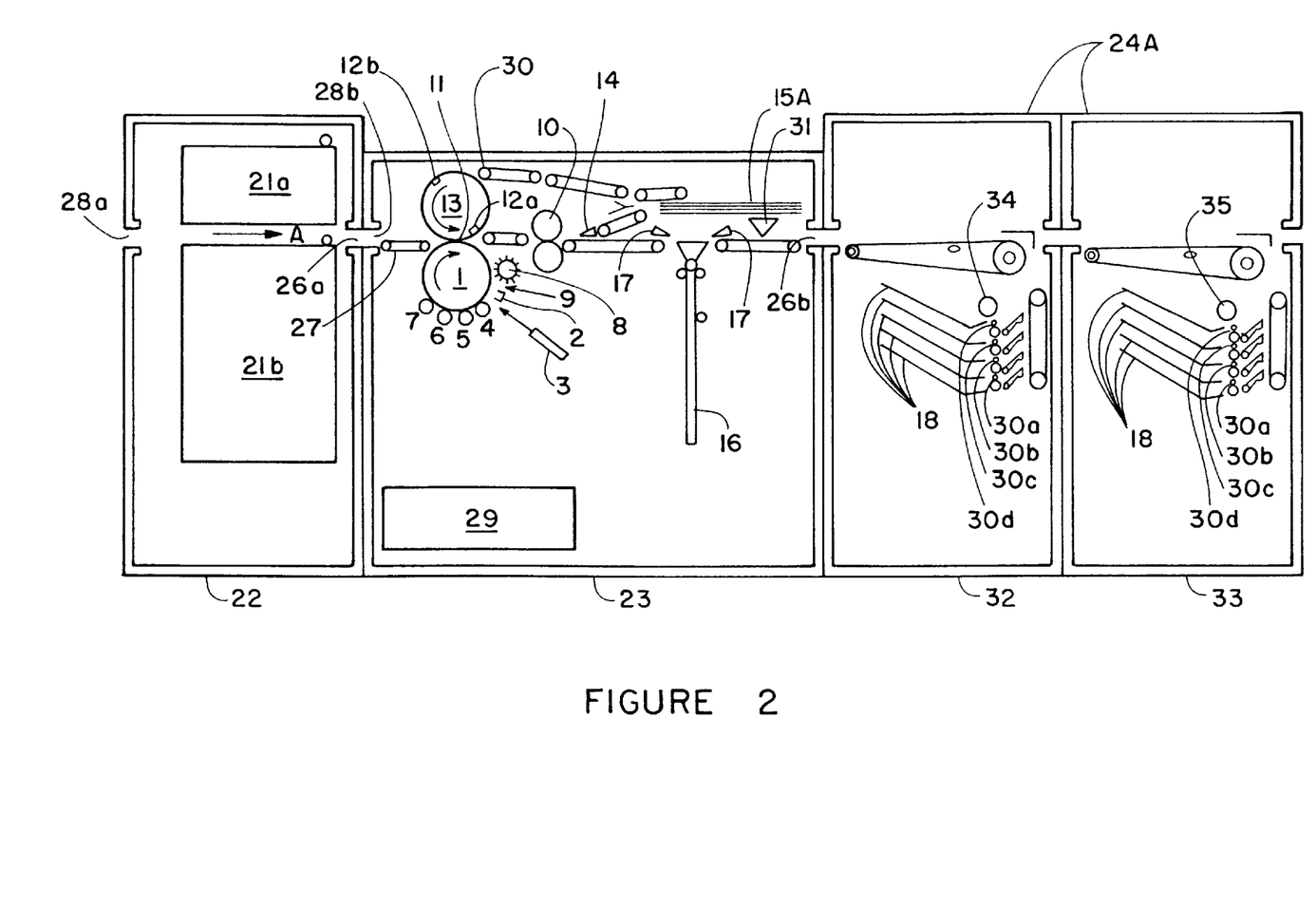
FIG. 2 is a front view section showing an image forming apparatus as illustrated in FIG. 1 with modified duplex loop path, inverter/buffer tray, and productivity module adaptable to execute the present invention.

To facilitate understanding of my inventive method I will first describe it using structural components illustrated in FIGS. 1 and 2 as embodied in my prior patent, U.S. Pat. No. 5,655,208 (or '208). This will later be followed by a description of the process with reference to the flow charts and tables which illustrate the process. It should be noted that the apparatus described and claimed in the '208 is capable of executing the process of my present invention, but such execution by that apparatus will require much experimentation before it is successful. Referring to FIG. 1, a modular image forming apparatus adaptable to execute the present invention is shown and implemented as a digital copier/printer having an image writing device, developing devices, an image transfer device, a fixing device, a paper feeding device, a two-sided copy loop, paper transporting devices and an output stacking device. The apparatus is modular in that it consists of a linear arrangement of paper input module 22, followed by marking module 23, followed by productivity module 24, followed by output stacker module 25.

The exemplary xerographic copier/printer and its apparatus controller 29 as the apparatus discrimination means, shown in FIG. 1 will now be described in further detail. Two input paper trays 21 are shown in paper input module 22. Marking module 23 includes a photoreceptor drum or belt 1 and stations acting thereon for respectively charging 2, exposing 3, developing multiple colors 4, 5, 6, 7, transferring 11, cleaning 8, and erasing 9. Transferred images are fixed to the paper by passing the sheet through fusing station 10. The copier/printer is adapted to provide mixed one-sided and two-sided page-sequential copy sets comprised of black and white and color images. The control of sheet feeding is conventional, by apparatus controller 29. Apparatus controller 29 is a conventional programmable microprocessor which also controls all of the other apparatus functions described herein. Marking module 23 includes two registration wait gates, a first registration wait gate 27 and a second registration wait gate 30, a transfer drum 13 with two registration grippers 12, a two-sided copy gate 14, a two-sided copy inverter 15, exit inverter gates 17, and an exit inverter 16. Productivity module 24 contains four intermediate sorter bins 18 with sorter bin sensors (30a, 30b, 30c and 30d) in each bin to detect the entry of paper.

FIG. 2 shows an example of the modified productivity module 24A, comprised of a first sorter module 32 and a second sorter module 33 each with 4 bins. Upon the completion of the sets in the respective modules, the respective sorter module fill sensor 34 or 35 is lit to alert the operator for manual unloading of the completed sets. The other sorter module is usually empty and available for continued printing. The duplex path is modified with the addition of a duplex inverter/buffer tray 15A.

Referring back to FIG. 1, clean copy sheets are first fed from one of the input paper trays 21a and 21b to the first to registration wait gate 27. The two paper trays can hold any type of copy paper. Typically, one tray holds one type of paper, such as, but not limited to standard 8½"×11" or A4, while the other tray holds another type, such as 11"×17" or A3. At the appropriate time, the sheet is re-fed to registration gripper 12a where the sheet is gripped and transported through xerographic transfer station 11 whereupon the transfer of a monochrome toner image from photoreceptor drum or belt 1 to one side of the sheet occurs. The copy sheet is mechanically registered against first registration gripper 12a and held against transfer drum 13 by static electricity forces. If a monochrome image is desired, first registration gripper 12a is released after transfer and the sheet passes into fusing station 10 for image fixing. Unless two-side copying is detected by the apparatus controller 29, the copy sheet is then advanced from the transfer station 11 to the second output port 26b. This is referred to as the first mode of operation and involves only a single pass transfer (multiple or single revolutions of photoreceptor 1) single color or multicolor copying. If multiple revolution, multiple pass transfer (on transfer drum 13) or two-sided copying is desired and detected by the apparatus controller 29, the process enters either one or both of what is referred to as the second mode of operation and the third mode of operation, respectively.

For multiple revolution, multiple pass copying, the color copying process is accomplished such that the cyan, magenta, yellow, and black images are separately transferred onto a sheet of copy paper and overlaid on each other sequentially during multiple revolutions of the photoreceptor drum 1 at the transfer station 11. Before each succeeding revolution, the photoreceptor 1 is cleaned. During each revolution, the charging station 2 and the exposing station 3 engage with the respective color development stations 4, 5, 6, and 7 to develop the image on the photoreceptor 1.

For multiple revolution, single pass transfer operation, the color processing is accomplished such that the cyan, magenta, yellow, and black images are overlaid on each other on the photoreceptor 1 sequentially during multiple revolutions of the photoreceptor 1. During each such revolution, the charging station 2 and the exposing station 3 engage with the respective color development stations 4, 5, 6, and 7 to develop the image on the photoreceptor 1. The developed color image is then transferred onto the sheet of copy paper only once at the transfer station 11.

In the single revolution, single pass transfer, the color processing is accomplished by adding multiple charging stations and multiple exposure stations for each separate color such that the cyan, magenta, yellow, and black images are overlaid on each other by the respective development stations 4, 5, 6, and 7 on the photoreceptor I sequentially during one revolution of the photoreceptor. The developed image is then transferred onto the sheet of copy paper only once at the transfer station 11.

For multiple-pass transfer color copying the sheet is held on transfer drum 13 by the registration means and is re-fed to the transfer station 1I until the desired number of colors is achieved followed by transport into the fusing station 10. Whereas for single revolution single pass transfer color copying or multiple revolution single pass transfer color copying, the copy sheet is fed to the transfer station 11 one time followed by transport into the fusion station 10. Unless two-sided copying was also detected, the copy sheet is advanced from the transfer station 11 to the second output port 26b. This is the second mode of operation. At least two copy sheets can be held onto the transfer drum 13 by the first registration gripper 12a and by the second registration gripper 12b.

For two-sided copying, after fusing, the copy sheets are fed to the two-sided copy gate 14 which functions as a one- or two-sided copy selector. Depending on the position of the two-sided copy gate, up or down, the copy sheets will either be deflected upward, with the gate down, into the two-sided copy inverter 15 or will continue straight, with the gate up, to the exit inverter gate 17 and out the second output port 26b. This is the third mode of operation.

In the event a two-sided copy is desired, the sheet is transported upward into two-sided copy inverter 15 and re-fed to second registration wait gate 30. At the appropriate time, the sheet is re-fed to first registration gripper 12a or second registration gripper 12b. The respective grippers are on substantially opposite diametric ends of each other. As a result of this configuration, the respective registration grippers provide the registration means for holding more than one sheet of copy paper at a time and assisting in the movement through transfer station 11. Each gripper can grip, hold, and move a sheet of copy paper. When a sheet is so gripped it is gripped and transported through xerographic transfer station 11 one or more times whereupon the transfer of a monochrome or colored toner image from photoreceptor drum or belt 1 to the second side of the sheet occurs. Upon complete image transfer, first registration gripper 12a is released after transfer and the sheet passes into fusing station 10 for second side image fixing.

Exit inverter gate 17 can now be employed to invert the sheet if an image-side-up copy sheet orientation is desired. In the event exit inverter gate 17 is closed, the copy sheet will be deflected downward into exit inverter 16 and re-fed to the second output port 26b. In the event the exit inverter gate 17 is open, the copy sheet will bypass the exit inverter 16, will be inverted, and then be acquired by the second output port 26b for final exit or for transport into one or more intermediate sorter bins 18 and/or one or more stacker modules 25.

The fixed copy sheet is now transported into productivity module 24. The productivity module optimally contains a number of intermediate sorter trays 18, the number being referred to as N. N is derived from the width of the copy paper being used or W and the length of the holding section or HS. As illustrated in FIG. 2, where a duplex copy inverter/buffer tray 15A is used in the duplex loop, the length of the holding section will seem elongated due to the additional number of sheets in the buffer tray 15A. The holding section is that distance beginning approximately from transfer station 11 up from the two-sided copy gate 14, into the complete length of the two-sided copy inverter 15, and up to the second registration gripper 12b. N, therefore, is the lowest whole number as derived from HS÷W. Where N is a predetermined quantity, HS is derived from $N.times.W$. An efficient value for N is about three to six copy sheets of standard size 8½"×11" or A4 paper. For optimum results, N is a value of about four such sheets, or their equivalent. The number of bins is related directly to the value N.

Figure 3:
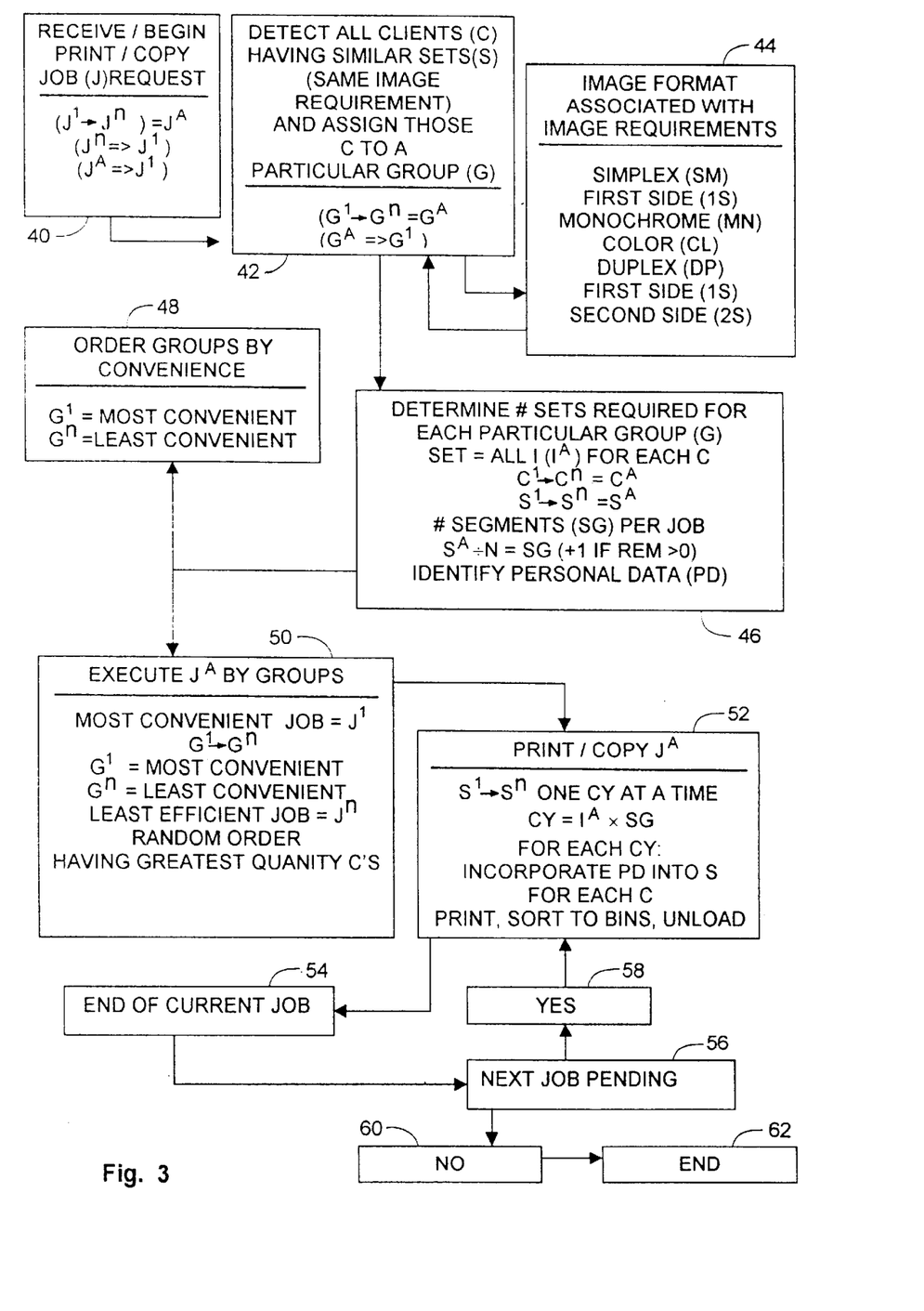
FIG. 3 is a flow chart illustrating the process of the present invention.

In this regard apparatus controller 29 houses a program which embodies and is adaptable to execute my process. With the foregoing as a background, reference now should be made to FIGS. 3 and 4. The process calls for printing by group, groups having the same exact format type of images, excluding personalized data or content (referred to as a set), associated with each customer, client, or person in that particular group.

For reference purposes 'G' refers to 'group'; 'C' refers to 'client' or 'customer' or 'person' or 'entity' or 'item'; 'S' refers to 'set'; 'SG' refers to 'segment'; 'CY' refers to 'cycle'; and 'I' refers to 'image' with $I^A$ representing all I's in a set (S). $I^A$ in a set (S) are exact as to format type, arrangement, number of sheets, and scoring of sheets (if necessary for the print job requirements). Format type refers to single or simplex copy [SM or simp] with a first side [1S or FS] only; double-sided or duplex copy [DP or dup] with a 1S and a second side [2S or SS]; monochrome [MN]; color [CL]; and scoring [SC], i.e., perforating or placing partial cuts on the sheet to thereby make it frangible).

All C's having the exact same I's (by format type, arrangement, and number of sheets) are sorted into a particular group ($G^1$ through $G^n$ which thereby encompasses all groups or $G^A$, $G^A=>G^1$). A sheet as printed in a set may be SM and thereby be printed on one side (1S) only or it may be DP and thereby be printed; on both sides (1S and 2S).

Except for personalized data (PD) unique to each C, such as, but not limited to name, address, account number, amount[s] owed, and the like, the sets (S) for all C's in the same G are identical by format type, arrangement, number of sheets, and scoring the sheets (if necessary). Since not all C's will have the same identical I's, more than one S may be sorted and once so sorted that S will be placed into a different G. In other words, all sets ($S^A$) comprise $S^1$ through $S^n$. Similarly all clients ($C^A$) comprises $C^1$ through $C^n$. In some cases $S^n=>C^n$.

Once so sorted, a particular G will have a certain number of C's therein (generally more than one), each individual C having identical S's associated with the print job. A particular job (J) may call for one or more C's to have their images [or sets] printed more than once (two copies [sets] being required for one particular C). In this regard, $S^A=>C^A$. Printing is done in cycles (CY) and segments (SG). CY and SG are dependent on N, $I^A$, and $S^A$. $CY=I^A \times SG$; and $SG=S^A \div N$ (+1 if remainder>0). Simply put, a cycle (CY) prints a first image (1I) for as many sets (S) as there are bins (N). The process then moves on to the second cycle (CY2) to print the second image (2I) for the same S's until N amount of 2I's are printed, then on to 3I, 4I, and so on, until all I's ($I^A$) for all those S's equal in number to N have been completed. This is the first segment (SG1) of this print job which includes N number of S's each having one complete set printed. Note that the cycles (CY) are driven by sets (S) rather than by clients (C). This is due to the fact that a particular print job may require more than one complete copy (set) for one or more particular C. In such cases $S_A > C^A$.

The controller 29 can be programmed to order the groups by most efficient print job (i.e., that group containing the largest number of easiest print jobs, such as, by way of example only and not by way of limitation, SM and MN only or DP and MN only and, for reference purposes only, is referred to as $G^1$) or the most convenient print job as the case may be. Group ordering may be by least efficient print job (for reference purposes only referred to herein as $G^n$), random, or by groups containing the greatest quantity of C, or by which print job is most convenient based on the needs or desires of the user. A job (J) may consist of any one or more groups. There may be more than one job; i.e., $J^1$ through $J^n$, such that $J^1$ through $J_n=J^A$ and $J^A=>J^1$. The point here is that each group contains identical sets for each C within that group for printing of invoices, bills, brochures, personalized cover letters, and the like; each personalized for the intended recipient (C).

As discussed earlier, exact same image type refers to the formats associated with each group; that is, each C for a particular group has the same number of SM, or DP, or MN, or CL, or SC, or any combination thereof and, therefore, the same number of sheets each arranged in the same order. Printing of S is done in the same sequence for each C of that group. Generally, each S consists of more than a single image and more than a single sheet. The only difference for each C is the content or individualized personal data [PD] associated with each C; such content generally will be different for each individual C and may be extracted from a data base associated with the user and inserted onto the forms or letters where appropriate.

Figure 4A:
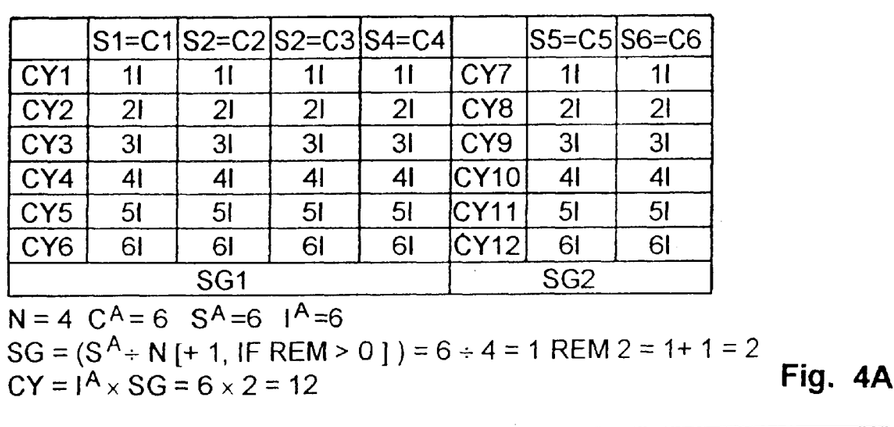
FIG. 4 consists of tables illustrating the process.

By way of example, assume a particular job (J) requires printing images ($I^A$) for a group (G) containing six clients (6C). Reference is now made to FIG. 4A. The I's include one simplex (SM) monochrome (MN) image (consisting of one sheet [SH1]), two duplex (DP) monochrome (MN) images (each consisting of one sheet [SH2 and SH3] with images on each side of SH2 and SH3), and one simplex (SM) monochrome (MN) image (consisting of one sheet [SH4]) in that order, for a total of six images (6I) comprising four sheets. Each S, therefore, consists of 6I ($I^{A=6}$), with the first side of the first SM document being the first I (1I and the first sheet [SH1]) printed for each C, the first side of the first DP document being the second I (2I and the first part of the second sheet [SH2]) printed for each C, the second side of the first DP document being the third I (3I and the second part of the second sheet [SH2]) printed for each C, the first side of the second DP document being the fourth I (4I and the first part of the third sheet [SH3]) printed for each C, the second side of the second DP document being the fifth I (5I and the second side of the third sheet [SH3]) printed for each C, and the first side of the second SM document being the sixth I (6I and the fourth sheet [SH4]) printed for each C.

The apparatus in this example has four sorter or storage bins, therefore, N=4. The total number of SG's for this small job (J) is 2; that is, SG=($S^A$÷N [+1 if REM >0])=6÷4=(1+REM2)=1+1=2. The images associated with the print job will be printed sequentially; in order of arrangement of each set. The process will be as follows: the first I (1I) for the first C (1C), the second C (2C), the third C (3C), and the fourth C (4C) will be printed as a first cycle (CY1) of this print job and then will be sent to the bins for storage. This is based on N=4. The next image (2I) for each C will next be printed as the next cycle (CY2) of this print job and then will be sent to the bins and mated with its respective C's prior image (1I) and so on until all six I's have been printed, sent to the bins, and mated with the other sheets of the set for a particular C. When this segment (SG or SG1) has been completed and all I's for the first four C's [or S's] have been printed, they exit the bins thereby providing bin storage for the next segment of sets, and so on, until the job has completed.

Figure 4B:
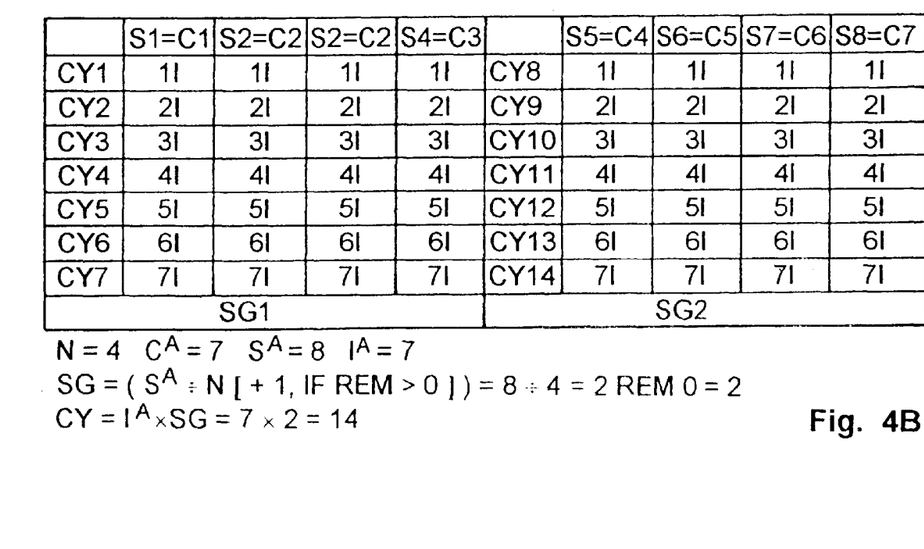
Figure 4C:
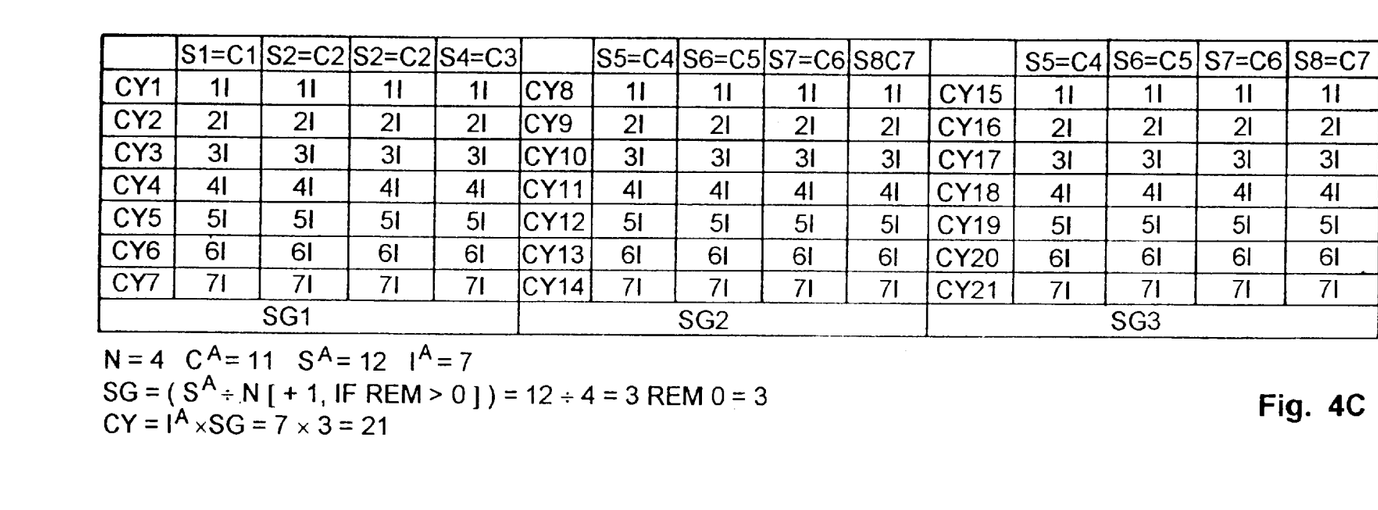

If in the example above assume there are seven C's each with seven I's with C2 requiring two sets (reference is now made to FIG. 4B). In such a case, the process would print 1I for C1, C2, C2, and C3 as the first print cycle (CY1) and send the printed sheets to the bins, followed by 2I for C1, C2, C2, and C3, and so on. In this case, though there are seven C's, eight S's would be printed, each containing seven I's. Printing each set in sequence provides for proper collation and greater convenience.

Taken together these conditions will minimize the number of skipped or lost process pitches and thereby maximize apparatus productivity. The apparatus controller provides the logic means and the control means for detecting which operating mode should be engaged, how many copies are required, whether two-sided or single-sided, whether color or black and white, how many sheets can be temporarily and movingly held in the holding section in relation to how many intermediate bins 18 or N are contained within the productivity module 24, whether copies will be inverted by the exit inverter gate 17, and for emitting a signal to each respective responsible structure to engage in the operations so detected. Maximizing use of the holding section based on the mode of operation will minimize the quantity of skip frames associated with the printing of personalized sets (containing variable data) in short runs (1, 2 or 3 usually).

By way of further illustration, consider a monochrome (MN) personalized billing job, such as an invoice, for fourteen customers (C1 through C14), each requiring printing of one copy of their respective images ($I^A$). In this case, the number of sets [or $S^A$=14] and $S^A$=$C^A$. The number (N) of bins 18 is four. The number of CY=$S^A$/N=4. Each S has four I's comprised of three sheets containing variable data. The sheets are two one-sided sheets (SM) followed by one two-sided sheet (DP). The printing sequence will be executed as follows:

CY1, consisting of the first image (1I) for customers 1, 2, 3, and 4 (C1 through C4), is printed and sent to the output bins 1 through 4, followed by CY2 consisting of the second image (2I) for customers 1, 2, 3, and 4 (C1 through C4) which is next printed and sent to the output bins 1 through 4, followed by CY3 consisting of the third image (3I) for customers 1, 2, 3, and 4 (C1 through C4) which is next printed and sent to the duplex loop, followed by CY4 consisting of the fourth image (4I) for customers 1, 2, 3, and 4 (C1 through C4) which is printed as duplex (DP) and then sent to the output bins 1 through 4. Since this completes the first SG (SG1) comprising a complete set for each of C1 through C4, these sets are unloaded. Printing resumes in the same fashion as described and so on for customers 5 through 8, customers 9 through 12, and finally customers 13 through 14. Except for the unloading (which is not set forth below), the process is depicted below as ("cust." refers to customer or other entity):

First image for cust.(1#4)=1IC1+1IC2+1IC3+1IC4=Sheet#1, Simplex, to bins Second image for cust. (1#4)=2IC1+2IC2+2IC3+2IC4=Sheet#2, Simplex, to bins Third image for cust.(1#4)=3IC1+3IC2+3IC3+3IC4=Sheet#3, First side, to loop Fourth image for cust.(1#4)=4IC1+4IC2+4IC3+4IC4=Sheet#3, Second side, to bins Followed by, First image for cust.(5#8)=1IC6+1IC7+1IC8=Sheet#1, Simplex, to bins Second image for cust.(5#8)=2IC5+2IC6+2IC7+2IC8=Sheet#2, Simplex, to bins Third image for cust.(5#8)=3IC5+3IC6+3IC7+3IC8=Sheet#3, First Side, to loop Fourth image for cust.(5#8)=4IC5+4IC6+4IC7+4IC8=Sheet#3, Second Side, to bins Followed by;

First image for cust.(9#12)=1IC9+1IC10+1IC11+1IC12 Sheet#1,Simp, to bins Second image for cust.(9#12)=2IC9+2IC10+2IC11+2IC12=Sheet#2, Simp, to bins Third image for cust.(9#12)=3IC9+3IC10+3IC11+3IC12=Sheet#3, FS(Sim), to loop Fourth image for cust.(9#12)=4IC9+4IC10+4IC11+4IC12=Sheet#3, SS(Dup), to bins Followed by;

First image for cust.(13#14)=1C13+1IC14=Sheet#1, Simp, to bins Second image for cust.(13#14)=2IC13+2IC14=Sheet#2, Simp, to bins Third image for cust. (13#14)=3IC13+3IC14+Blank+Blan=Sheet#3,FS(Sim), to loop Fourth image for cust.(13#14)=4IC13+4IC14=Sheet#3, SS(Dup), to bins In this case, the total number of process frames required to complete the job is equal to 58 (16+16+16+8+Blank+Blank) for a monochrome job. The same process can be used for the mixed color and monochrome originals except that multiple print cycles may be needed to print each original image depending on the architecture of the color printing apparatus.

As mentioned above, four personalized sets (one each) for each of customers C1, C2, C3 and C4 will be printed and sent into the respective bins and each sheet detected by bin sensors 30a, 30b, 30c and 30d. Again, followed by four personalized sets (one each) for customers C5, C6, C7 and C8 followed by four personalized sets(one each) for customers C9, C10, C11 and C12 and finally followed by two personalized sets (one each) for customers C13 and C14.

According to the prior art, this job might be printed using the two-sided mode for the whole job. In the pre-collation mode, each customer set will have to be prepared sequentially. And for each customer, seven process frames will be required to complete a set. The printing sequence is, the first image of customer#1 (C1), followed by the second image of C1, followed by the third image of C1, followed Blank pitch sent to the duplex loop and then second side printed as blank (over simplex 1IC1), blank (over simplex 2IC1), followed by the fourth image of C1 (duplex 4IC1 over 3IC1) and sent to the output tray as a collated set for customer#1 and then similarly repeated for the next thirteen customers. In other words, the printing sequence for the prior art can be explained as:

1IC1+2IC1+3IC1+Blank+Blank+Blank+4IC1 followed by

1IC2+2IC2+3IC2+Blank+Blank+Blank+4IC2 followed by

1IC3+2IC3+3IC3+Blank+Blank+Blank+4IC3 followed by

1IC4+2IC4+3IC4+Blank+Blank+Blank+4IC4 followed by

1IC5+2IC5+3IC5+Blank+Blank+Blank+4IC5 followed by

1IC6+2IC6+3IC6+Blank+Blank+Blank+4IC6 followed by

1IC7+2IC7+3IC7+Blank+Blank+Blank+4IC7 followed by

1IC8+2IC8+3IC8+Blank+Blank+Blank+4IC8 followed by

1IC9+2IC9+3IC9+Blank+Blank+Blank+4IC9 followed by

1IC10+2IC10+3IC10+Blank+Blank+Blank+4IC10 followed by

1IC11+2IC11+3IC11+Blank+Blank+Blank+4IC11 followed by

1IC12+2IC12+3IC12+Blank+Blank+Blank+4IC12 followed by

1IC13+2IC13+3IC13+Blank+Blank+Blank+4IC13 followed by

1IC14+2IC14+3IC14+Blank+Blank+Blank+4IC14

In this prior art case, 98 (14 customers multiplied by seven frames per set) process frames would be required to print the job. It is assumed that the two-sided copy loop capacity is four sheets. This is mainly due to the fact that the number of sheets per set is not large enough to fill the duplex loop and the one-sided sheet has to be treated like two-sided sheets for proper collation.

Hence, the prior art method results in productivity losses of (98–58)=40 process frames which is almost 70 percent in this case. The productivity improvements will vary with the job mix and in the case of intermixed monochrome and color pages the productivity improvements could be considerably higher. With the abovesaid invention, variable printing of customized jobs can be executed in the mixed, one sided and two-sided mode with black and white or color at the highest productivity.

A second important system benefit results from use of said productivity module 24 or 24A. As has been pointed out, the presence of productivity module 24 (FIG. 1) or 24A (FIG. 2) permits the printing of nearly identical in format and even substrate (yet personalized) images –N at a time instead of one at a time as is done using the prior art. Because N nearly identical images are printed at a time that would most likely require identical treatment inside the printing apparatus, for example, the front page may be simplex but requires hi-light color or the front sheet may require sheet scoring, as an example, for the return billing statement, this invention provides more available time to engage or disengage input paper tray (21), or developing stations (4,5,6,7) or sheet scoring device (31) or other similar devices.

A third important benefit of this printing approach is even higher productivity in case of variable printing (personalized A4 sets) of mixed color and monochrome in a multiple cycle (4-pass) color printing apparatus where the transfer drum, 13 holds two A4 sheets. In such cases, according to the prior art, if the first image is colored, as for example a personalized cover letter with company logo and the following sheet is monochrome, the second sheet with monochrome image will be fed though the transfer cycle 4 times and 3 of these cycles are unnecessary. Whereas, in the abovesaid invention, the first image of customer#1 (C1) and the first image of customer#2 (C2) will be wrapped around the drum, which is identical in color, paper texture etc.

A fourth important system benefit results from use of said productivity module 24 or 24A because the presence of productivity module 24 or 24A permits the printing of similar (yet variable) images one, two or three sets at a time, and deposits them sequentially in bins 1 thru N. With the help of the sorter bin sensors 30a, 30b, 30c, 30d etc., the printing system is able to automatically check if the correct printed images on a particular sheet are being sent to the correct bins. Also, this scheme will easily allow the apparatus controller (29) to check the job integrity from set to set simply by assigning a destination bin number for each sheet fed from the paper tray (21), tracking in process and matching the arrival of the printed sheet in the specified bin tray through the respective sorter bin sensors 30a, 30b, 30c, 30d, etc. This invention claims to substantially improve the job integrity which can be a serious problem in the prior art.

FIG. 1 is a simplified elevational view of the paper path of an on-demand printing apparatus, capable of simplex or duplex output, in which a stream of digital video signals representative of images desired to be printed causes the desired images to be formed on a selected side of a print sheet. The particular architecture shown in FIG. I is for an electrophotographic printer adaptable of executing my process. It must be understood, however, that the principle of the invention could apply equally to other types of image-creation technologies, such as ink-jet printing or other variants of electrophotographics, as for example tri-level hi-light color or tandem (dual) engine architectures.

It will be noted that the specifically electrostatographic aspects of the apparatus shown in FIG. 1, such as the photoreceptor 1, charging and exposing stations 2 and 3, and the developing stations 4,5,6 and 7, could be replaced by equivalent elements and be capable of creating images and be adaptable to execute my process. As an example, an ink jet printer may be used rather than what has been illustrated in FIGS. 1 and 2. It must be further understood that FIGS. 1 and 2 are for illustration purposes only, and not by way of limitation. Additionally, if the original source of images to be created are themselves a set of automatically fed hard-copy images, i.e., if the printing system as a whole is operating as a copier, the feeding of originals will also create certain constraints on the optimal order of images created with the printer. It is probably preferable to digitize (convert to digital signals) the original hard-copy images, electronically store the resulting data, and apply the data as required to a digitally-based exposing station 2.

The present disclosure includes that contained in the present claims as well as that of the foregoing description. Although this invention has been described in its preferred form with a certain degree of particularity it is understood that the present disclosure of the preferred form has been made only by way of example and numerous changes in the details of construction and combination and arrangement, of parts and method steps may be resorted to without departing from the spirit and scope of the invention. Accordingly, the scope of the invention should be determined not by the embodiinent[s] illustrated, but by the appended claims and their legal equivalents.

I claim:

1. A method of printing variable image requirements comprising the steps of:
   a. placing all entities with similar print image requirements into a particular group, said similar print image requirements having similar format types and similar arrangements and the same number of sheets for a print job, said similar print image requirements comprising a set for each one of said all entities in the particular group;
   b. printing images of each set in sequence of arrangement and in cycles, each said cycle comprising a number of said images up to the number of storage bins of a printing apparatus used for said print job, and storing the printed cycles in said storage bins until all sheets to the sets being so stored in said storage bins are completed;

c. unloading said completed sets from said storage bins;

d. repeating steps b and c above if additional sets in the particular group require printing; and e. scoring sheets which require such scoring.

2. The method as claimed in claim 1 further comprising the step of ending said print job if all sets for the particular group have been printed.

3. The method as claimed in claim 1 further comprising the step of determining whether a next print job for another particular group is pending and a. if said next print job is pending, repeating steps b through e of claim 1 and the step of claim 2;

b. if said next print job is not pending, ending all print jobs if said next print job is not pending.

4. The method as claimed in claim 1 further comprising the step of identifying personal data associated with each said entity and incorporating for printing said personal data into the respective images associated with each said entity.

5. The method as claimed in claim 4 wherein said personal data are incorporated into said print job during the execution of each said cycle.

6. The method as claimed in claim 1 further comprising the step of printing said print job based on convenience of execution.

7. The method as claimed in claim 1 further comprising the step of tracking each printed sheet and detecting entry of each printed sheet into respective said storage bins.

8. A method of printing personalized variable image requirements comprising the steps of:

a. placing all entities with similar print image requirements into a particular group, said similar print image requirements, except for personal data associated with each said entity, having similar format types and similar arrangements and the same number of sheets for a print job, said similar print image requirements comprising a set for each one of said all entities in the particular group;

b. identifying personal data associated with each said entity and incorporating for printing said personal data into the respective images associated with each said entity;

c. printing images of each set in sequence of arrangement and in cycles, each said cycle comprising a number of said images up to the number of storage bins of a printing apparatus used for said print job, and storing the printed cycles in said storage bins until all sheets to the sets being so stored in said storage bins are completed;

d. unloading said completed sets from said storage bins; and e. repeating steps b through d if additional sets in the particular group require printing.

9. The method as claimed in claim 8 further comprising the step of ending said print job if all sets for the particular group have been printed.

10. The method as claimed in claim 8 further comprising the step of determining whether a next print job for another particular group is pending and a. if said next print job is pending, repeating steps b through e of claim 9 and the step of claim 10;

b. if said next print job is not pending, ending all print jobs if said next print job is not pending.

11. The method as claimed in claim 8 wherein said personal data are incorporated into said print job during the execution of each said cycle.

12. The method as claimed in claim 8 further comprising the step of printing said print job based on convenience of execution.

13. The method as claimed in claim 8 further comprising the step of tracking each printed sheet and detecting entry of each printed sheet into respective said storage bins.

14. The method as claimed in claim 8 further comprising the step of scoring sheets which require such scoring.

* * * * *